United States Patent [19]

Kohlhaupt et al.

[11] Patent Number: 5,424,453
[45] Date of Patent: Jun. 13, 1995

[54] PURIFICATION OF INDIGO

[75] Inventors: Reinhold Kohlhaupt, Frankenthal; Udo Bergmann, Bensheim, both of Germany

[73] Assignee: BASF Aktiengesellschaft, Ludwigshafen, Germany

[21] Appl. No.: 75,881

[22] Filed: Jun. 14, 1993

[30] Foreign Application Priority Data

Jun. 25, 1992 [DE] Germany .............. 42 20 804.1

[51] Int. Cl.⁶ .................................. C07D 403/04
[52] U.S. Cl. ........................................ 548/457
[58] Field of Search ............................ 548/457

[56] References Cited

U.S. PATENT DOCUMENTS

| | | | |
|---|---|---|---|
| 4,973,706 | 11/1990 | Yamamoto et al. | 548/457 |
| 4,992,556 | 2/1991 | Takaki et al. | 548/457 |
| 5,075,458 | 12/1991 | Kohlhaupt et al. | 548/457 |
| 5,109,137 | 4/1992 | Kohlhaupt et al. | 548/457 |
| 5,112,987 | 5/1992 | Yamamoto et al. | 548/457 |
| 5,116,996 | 5/1992 | Kohlhaupt et al. | 548/457 |
| 5,116,997 | 5/1992 | Kohlhaupt | 548/457 |
| 5,187,283 | 2/1993 | Yamamoto et al. | 548/457 |

FOREIGN PATENT DOCUMENTS

| | | |
|---|---|---|
| 0036523 | 9/1981 | European Pat. Off. . |
| 0101061 | 2/1984 | European Pat. Off. . |
| 3522680 | 1/1987 | Germany . |

*Primary Examiner*—David B. Springer
*Attorney, Agent, or Firm*—Oblon, Spivak, McClelland, Maier & Neustadt

[57] ABSTRACT

This invention relates to a process for the purification of indigo, wherein the indigo is heated in an inert organic solvent at from 150° to 250° C. and preferably from 180° to 220° C.

12 Claims, No Drawings

PURIFICATION OF INDIGO

Indigo, the most widely produced synthetic textile dye, still contains impurities, e.g., up to 0.6 wt % of aniline and 0.4 wt % of N-methylaniline, in spite of highly developed manufacturing processes. Furthermore, smaller amounts of other compounds are present, which it is desirable to remove.

It is thus an object of the present invention to provide an efficient and economical process for the purification of indigo, by means of which a dye can be produced which is free, or virtually free, from aromatic amines and other impurities.

Attempts to remove the aromatic amines present in indigo by conventional purifying methods, e.g., by washing or by stirring with dilute acids, by steam distillation or by extraction with organic solvents, have not as yet met with success, not even on extremely finely ground dye.

We have now found that virtually pure indigo is obtained, when the dye is treated, after synthesis, with an organic solvent at an elevated temperature.

The efficiency of the novel process for the purification of indigo is a surprising and unforeseeable effect, since in prior experiments on the treatment of indigo with organic solvents such as methanol, n-butanol, and toluene no purifying effect could be achieved even under refluxing conditions.

The treatment with organic solvents can be carried out either on an aqueous indigo paste or on the dry dye.

The amount of solvent required for the purification is about three to twelve times the dry weight of the dye used.

Indigo is extremely poorly soluble in all organic solvents, so that the dye is present in suspension, i.e. virtually undissolved, even at said ratios of solids to solvent.

The process of the invention can be particularly advantageously carried out by placing 1 part of indigo powder or 4 parts of aqueous indigo paste (solids content: 25 %) in from 3 to 12 parts and preferably from 5 to 9 parts, of an organic solvent and treating it, with stirring, for from 2 to 12 hours and preferably from 4 to 8 hours, at from 150° to 250° C. and preferably at from 180° to 220° C., following removal, by distillation, of any water present—as in the case of an aqueous indigo paste.

The pure indigo obtained after purification of the reaction mixture in a yield of more than 99 % (purity $\geq$ 98%, as determined photometrically) contains only from 0 to 0.08% of aniline and from 0 to 0.04% of N-methylaniline.

The process can be carried out with or without the use of pressure, continuously or batchwise. Examples of suitable solvents are solvents which are inert under the process conditions such as hydrocarbons, halohydrocarbons, ethers, ketones, acid amides, nitriles, and alcohols as well as esters or mixtures thereof.

Preferred solvents are, in particular, methyl benzoate, dimethylformamide, dimethyl acetamide, N-methylpyrrolidone, and o-dichlorobenzene.

The solvents used for the purification of the indigo can be used repeatedly without intermediate redistillation.

The invention is illustrated below with reference to the following examples, in which the parts and percentages are by weight.

EXAMPLE 1

In a stirred reactor having a capacity of 1 L there are placed 350 parts of methyl benzoate. After stirring in 50 parts of indigo powder (purity 96.5%, aniline content 0.6%, N-methylaniline content 0.35%), the reaction mixture is refluxed at 198° C. and kept at this temperature for 6 hours with stirring. After the reaction mixture has been cooled to room temperature, it is filtered. The filtered material is placed in 300 parts of water and freed, by steam distillation, from adhering methyl benzoate. Following desiccation in vacuo at 100° C., there are obtained 48.5 parts of indigo having a purity of 98.6% (as determined photometrically).

The yield is 47.82parts of indigo (calc. 100% =99.2% of theory). The indigo still contains 0.014% of aniline and <0.001% of N-methylaniline.

The filtrate can be reused once or twice for the purification of indigo, without redistillation.

EXAMPLE 2

In a stirred reactor having a capacity of 2 L and equipped with a distillation bridge there are placed 700 parts of methyl benzoate. After stirring in 370 parts of aqueous indigo paste (dry content: 27.9%; purity of the dried indigo: 97.0%; content of aniline: 0.55%; content of N-methylaniline: 0.35%), the suspension obtained is heated at ca 195° C., and all of the water present distills off within 2 hours. The distillation bridge is replaced by a reflux condenser and the reaction mixture is refluxed at 198° C. over a period of 6 hours.

The indigo suspension is then cooled and worked up as described in Example 1 to give 100, 8 parts of indigo having a purity of 98.2% (measured photometrically).

The yield is 99,0 parts of indigo ( calc. 100% ), this being equal to 99% of the indigo used for the purification. The dye still contains 0.04% of aniline and 0.02% of N-methylaniline.

EXAMPLE 3

In a stirred autoclave having a capacity of 2 L there are charged 700parts of methyl benzoate and 370 parts of aqueous indigo paste of the same quality as used in Example 2. After the autoclave has been sealed, the reaction mixture is heated to 200° C. with stirring, and the pressure in the reactor rises to 15 bar. After stirring for five hours at 200° C./15 bar, the autoclave is opened following cooling of the indigo suspension to room temperature.

Following filtration, the recovered indigo is worked up as described in Example 1. 99,6parts of indigo having a purity of 99.7% (as measured photometrically) are obtained, this being equivalent to a yield of 99.3% of the indigo used for the purification. The dye contains 0.01% of aniline and 0.005% of N-methylaniline.

We claim:
1. A process for the purification of indigo comprising heating said indigo, at a temperature of 150° C. to 250° C., in an inert organic solvent in which said indigo is extremely poorly soluble, said solvent being capable of and constituting means for removing aniline impurities from said indigo.
2. The process according to claim 1, wherein the indigo is heated at a temperature of 180° C. to 220° C.
3. The process according to claim 1, wherein one part by weight of said indigo is heated in from 3 to 12 parts by weight of said inert organic solvent.

4. The process according to claim 3, wherein one part by weight of said indigo is heated in from 5 to 9 parts by weight of said inert organic solvent.

5. The process according to claim 1, wherein said heating is carried out over a period of from 2 to 12 hours.

6. The process according to claim 5, wherein said heating is carried out over a period of from 6 to 10 hours.

7. The process according to claim 1, wherein said inert organic solvent comprises a lower alkyl benzoate.

8. The process according to claim 7, wherein said alkyl benzoate is methyl benzoate.

9. The process according to claim 1, wherein said indigo is dry indigo powder.

10. The process according to claim 1, wherein said indigo is aqueous indigo paste.

11. In a process for the purification of indigo by removal of impurities using a refluxing inert organic solvent, the improvement wherein said solvent is methyl benzoate.

12. A process for the purification of indigo comprising heating said indigo in an inert organic solvent selected from the group consisting of lower alkylbenzoate, dimethylformamide, dimethylacetamide, N-methylpyrrolidone, and o-dichlorobenzene, at a temperature of 150° C. to 250° C. and recovering purified indigo.

* * * * *